US010435872B2

(12) United States Patent
Godager

(10) Patent No.: US 10,435,872 B2
(45) Date of Patent: Oct. 8, 2019

(54) LEAKAGE PREVENTION MODULE

(71) Applicant: Sensorutvikling AS, Sandefjord (NO)

(72) Inventor: Øivind Godager, Sandefjord (NO)

(73) Assignee: SENSORUTVIKLING AS, Sandefjord (NO)

(*) Notice: Subject to any disclaimer, the term of this patent is extended or adjusted under 35 U.S.C. 154(b) by 0 days.

(21) Appl. No.: 15/509,435

(22) PCT Filed: Jul. 2, 2015

(86) PCT No.: PCT/NO2015/050121
§ 371 (c)(1),
(2) Date: Mar. 7, 2017

(87) PCT Pub. No.: WO2016/043595
PCT Pub. Date: Mar. 24, 2016

(65) Prior Publication Data
US 2017/0241111 A1  Aug. 24, 2017

(30) Foreign Application Priority Data

Sep. 17, 2014 (NO) .................................. 20141124

(51) Int. Cl.
*E03B 7/07* (2006.01)
*F16K 31/20* (2006.01)
(Continued)

(52) U.S. Cl.
CPC ............ *E03B 7/071* (2013.01); *A47L 15/421* (2013.01); *A47L 15/4212* (2013.01);
(Continued)

(58) Field of Classification Search
CPC . E03B 7/071; F16K 1/14; F16K 31/20; D06F 39/125; D06F 39/081; A47L 15/4212
See application file for complete search history.

(56) References Cited

U.S. PATENT DOCUMENTS 2,204,998 A * 6/1940 Ryan .................. B01D 17/0214
116/110
2,919,670 A * 1/1960 Clark, Jr. ................ B63B 29/16
114/185
(Continued)

FOREIGN PATENT DOCUMENTS

CA        2082084 A1    5/1994
CA        2 613 840 A1  6/2009
(Continued)

OTHER PUBLICATIONS

"NRL SmartStopp", Published: Jan. 16, 2012, http://www.rorleggern.no/images/template-content/BV_NRL_SmartStopp-LR.pdf, pp. 1-8.
(Continued)

*Primary Examiner* — William M McCalister
*Assistant Examiner* — Patrick C Williams
(74) *Attorney, Agent, or Firm* — Birch, Stewart, Kolasch & Birch, LLP

(57) ABSTRACT

A leakage prevention module arranged to prevent fluid leakage from a tube connected apparatus arranged in the leakage prevention module, including a fluid tight trough including a drain in fluid connection with a drainage connection arranged to be connected to a drain tube, a wall with a recess where a lower end of the wall is fluid-tight fixed to the fluid tight trough such that the recess faces away from the drain. A first internal drain tube with a first end terminated in the recess and arranged to be connected to a drain tube from an apparatus and a second end in fluid connection with the drainage connection, a first feedthrough in the wall, a termination module arranged in the recess, where the termination module is arranged for terminating an inlet tube led in through the first feedthrough and further includes a first outlet arranged to be connected to a first supply tube to the apparatus.

12 Claims, 3 Drawing Sheets

(51) Int. Cl.
*F16K 1/14* (2006.01)
*A47L 15/42* (2006.01)
*D06F 39/12* (2006.01)
*D06F 39/08* (2006.01)

(52) U.S. Cl.
CPC .......... *D06F 39/081* (2013.01); *D06F 39/125* (2013.01); *F16K 1/14* (2013.01); *F16K 31/20* (2013.01)

(56) References Cited

U.S. PATENT DOCUMENTS

| | | | | |
|---|---|---|---|---|
| 4,805,662 | A | * | 2/1989 | Moody ................. F24H 9/2021 122/14.3 |
| 4,944,253 | A | * | 7/1990 | Bellofatto ............... F24H 9/165 122/14.21 |
| 5,437,303 | A | | 8/1995 | Johnson |
| 8,416,089 | B1 | | 4/2013 | Clary |
| 2011/0187540 | A1 | | 8/2011 | Schwab |
| 2012/0192904 | A1 | * | 8/2012 | Francisco ........... A47L 15/4223 134/186 |

FOREIGN PATENT DOCUMENTS

| | | | | |
|---|---|---|---|---|
| DE | 3241460 A1 | * | 5/1984 | .......... D06F 39/081 |
| DE | 10 2007 056 425 A1 | | 5/2009 | |
| EP | 0 108 367 A2 | | 5/1984 | |
| EP | 2 455 534 A1 | | 5/2012 | |
| GB | 2 184 749 A | | 7/1987 | |

OTHER PUBLICATIONS

"CTM: Sikkerhetssystem mot vannlekkasjer", Aqua Xpress, vol. 1-4, Published: Oct. 14, 2017, pp. 1-13.

* cited by examiner

LEAKAGE PREVENTION MODULE

TECHNICAL FIELD

The present invention relates to leakage prevention in building, and especially from sanitary installations and heating and cooling installations.

BACKGROUND ART

Sanitary installations for a home or a building construction is a generic term for the fresh water supply and drainage of spill water and sewage. The sanitary installations start where the tapping of the supply line from the water distribution network is performed, and comprises further water tubes and distribution of hot and cold water, sanitary components and equipment like water heaters, armature, valves, and finally, basins, toilets, drains and drain pipes for draining the waste water.

The common term "sanitary components and equipment" comprises also technical installations connected to water like; laundry and dish washer machines, refrigerators with ice makers and water dispensers, hot drink dispensers, cabinet mounted heaters and water filters, etc.

Water damages usually originates from leaks in sanitary installations because of corrosion, frost, mechanical strain, pressure surges i.e. water-hammer surges, seal wear or human errors. The most wide spread reason for damages of technical sanitary installations is cracked water- and drain tubes and worn or defect parts like gaskets and fittings inside the installations.

In the SINTEF-report 3D098001 dated 25 Feb. 2011 with the title "Sanitaerinstallasjoner og vannskadesikkerhet—Bruk av lekkasjestoppere" (Sanitary installations and water damage safety—Use of leak stops), it is emphasized that on average 200 water damages are registered daily in Norway, a cost for the society of almost three thousand million Norwegian kroners in 2009. This number is increasing.

The Regulation on requirements for construction works and products for construction (TEK 10) from Statens bygningstekniske etat (2010) requires use of leak stops in all rooms with water installations, but without drains and waterproof floor covering. Such leak stops consist of a moisture sensor connected to a solenoid valve of the supply line to shut of water supply automatically when moisture is detected.

Such leak stops will then become a vulnerable component of the system. They need regular maintenance and testing to ensure proper operation. In addition they require electric power to operate. The sensors are often equipped with batteries that have to be changed, often in locations difficult to access.

U.S. Pat. No. 8,416,089 B1 describes a tray for collecting leaking fluid, such as water, and more specifically an enclosure for collecting liquid comprising an alarm to indicate the presence of a moisture leak.

EP0108367 A2 and U.S. 2011187540 A1 disclose a safety device for preventing water leakage where a solenoid valve is actuated by a moisture sensor.

Line rupture valves are a different type of leakage safety device arranged for closing off the water flow when it increases above a certain value. However, such valves does not actuate on smaller leaks.

Trays for placing underneath technical installations to make it easier to detect smaller leaks exist. However, such trays will not be of much help when there is a major leak.

SHORT SUMMARY

The present invention makes it possible to safeguard a sanitary installation against both smaller and larger leaks even when it is not placed in a wet room. It therefore solves the problems related to prior art described above.

In an embodiment the invention is a leakage prevention module (1) arranged to prevent fluid leakage from a tube connected apparatus (2) arranged in the leakage prevention module (1), wherein the leakage prevention module (1) comprises;
  a fluid tight trough (10) vat or tub, comprising a drain (11) in fluid connection with a drainage connection (12) arranged to be connected to a drain tube,
  a wall (20) with a recess (21) where a lower end of the wall is fluid-tight fixed to the fluid tight trough (10) such that the recess (21) faces away from the drain (11).
  a first internal drain tube (25a) with a first end (26) terminated in the recess (21) and arranged to be connected to a drain tube from an apparatus (2) and a second end (27) in fluid connection with the drainage connection (12).
  a first feedthrough (29a) in the wall (20),
  a termination module (18) arranged in the recess (21), where the termination module (18) is arranged for terminating an inlet tube led in through the first feedthrough (29a) and further comprises a first outlet (18a) arranged to be connected to a first supply tube to the apparatus (2).

The leakage prevention module does not prevent leakages from an apparatus or from the connections, but ensures that the unintentional water- or fluid flow do not harm the building framework or construction.

In its basic version, the leakage prevention module is a passive component that does not require energy supply or regular testing to function optimally.

The leakage prevention module can be viewed as a part of the sanitary installation and is in such applications an integrated sanitary component for drainage of spill water from leaks to a secured drain with e.g. detection and leak stop.

The leakage prevention module ensures that leaks in fittings or cracks in tubes, e.g. internally in the apparatus under most circumstances will not result in damages to the building.

The leakage prevention module (1) is a technical device adapted for standard construction and designed such that leakages are detected early, to reduce the harm done on the building secured against leaks as much as possible. An important factor is also that the installation or apparatus being secured can be operated easily and is accessible for maintenance and exchange of the apparatus or equipment without larger interventions in the building construction than necessary.

It is important that the leakage prevention module (1) is correctly mounted and that the user is aware of its functional area and the preconditions for maintaining the safety. In combination with a leakage detector and a leak stop, it is possible to achieve an even higher level of safety.

In addition to the leakage prevention achieved with a fully connected and installed apparatus, the actions related to connection and disconnection of the apparatus will also be splash- and leak proof. This is also valid for leakage prevention by replacement of the apparatus.

The leakage prevention module will then function as a local wet room in a room that was not initially thought of as a wet room, and by using double piped connections it is possible to achieve a very high level of security from end to end.

The leakage prevention module does not occupy any additional space in the finished room, compared to not using it. This means that an apparatus to be leak prevented can be placed in the room in the same way as if the leakage prevention module (1) had not been there. This makes it simple to plan and utilize the leakage prevention module for the builder and the end user will not notice any difference.

FIGURE CAPTIONS

The attached figures illustrate some embodiments of the invention

EMBODIMENTS OF THE INVENTION

Embodiments of the invention will now be described with reference to the attached figures.

Figure 1:
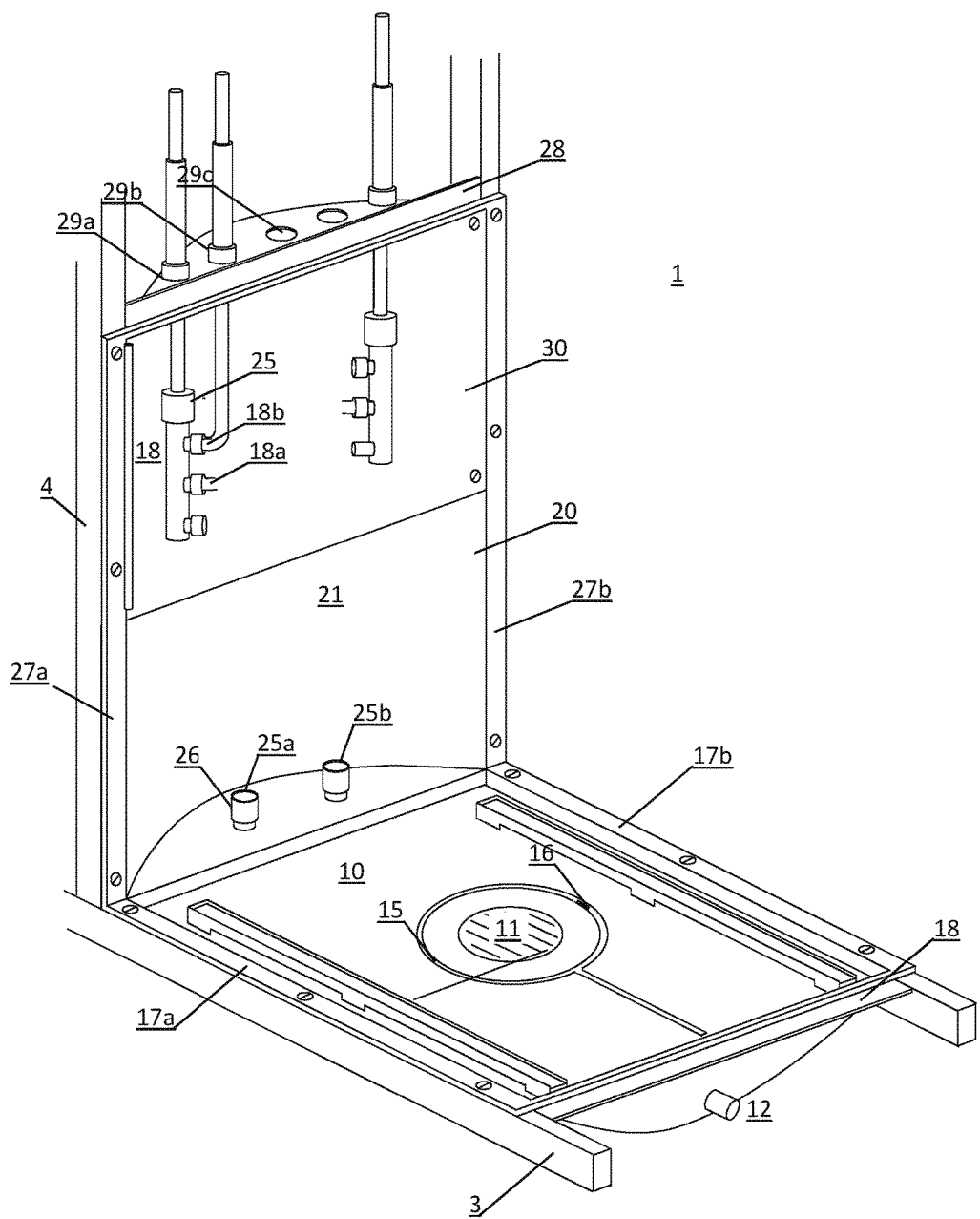
FIG. 1 shows a perspective view of an embodiment of a leakage prevention module according to the invention.
Figure 2:
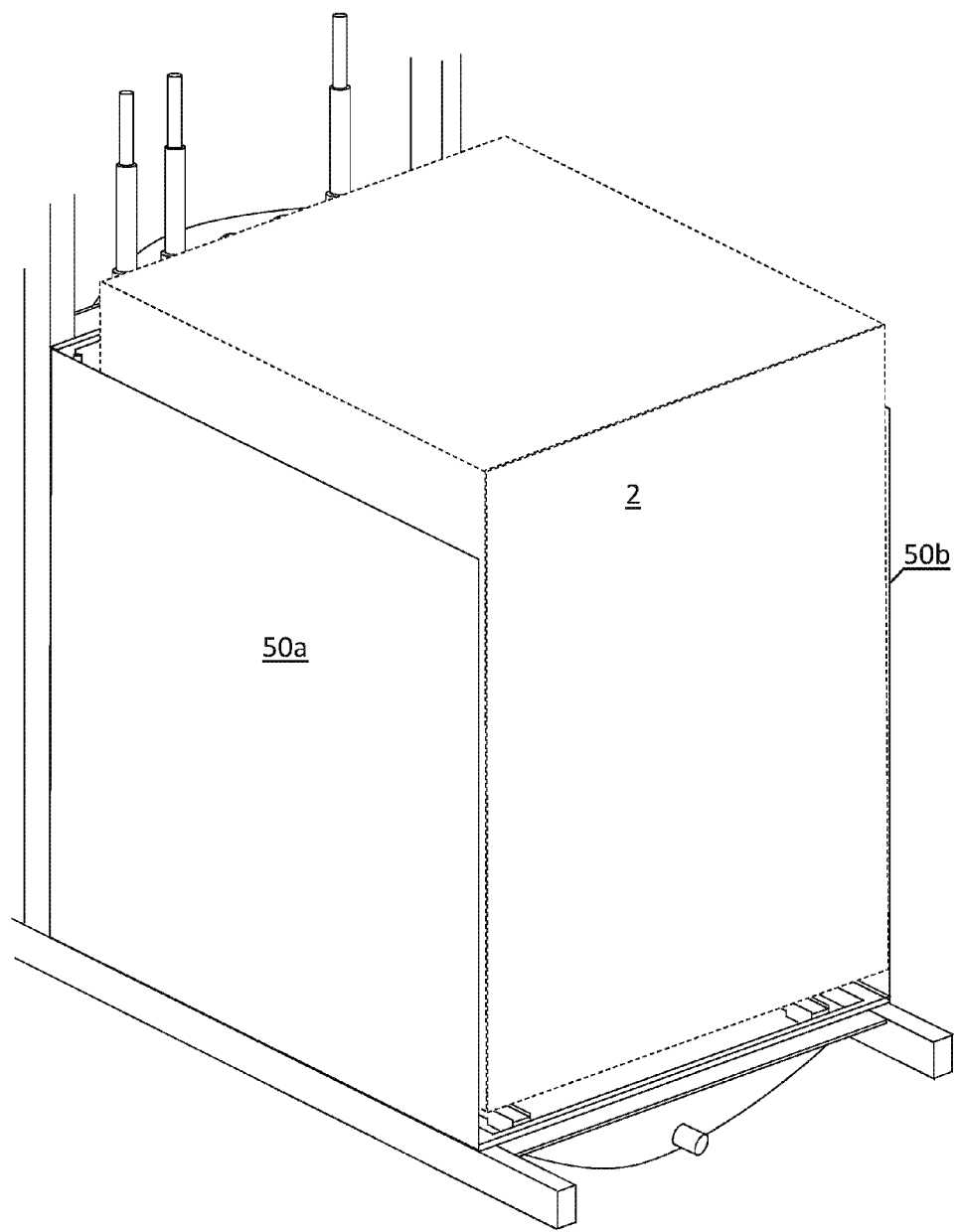
FIG. 2 shows a perspective view of an embodiment of a leakage prevention module with side walls according to the invention, wherein an apparatus being the subject of leakage prevention has been indicated.

FIG. 1 shows an embodiment of the leakage prevention module (1) mounted in a framing (3) in a floor and between the studs (4) in a wall. The apparatus (2) to be leakage protected is illustrated as placed inside the leakage prevention module (1) in FIG. 2.

The leakage prevention module (1) comprises a fluid tight trough (10) lowered between the framing (3), such that the bottom of the trough lies below the level of the finished floor.

Figure 3:
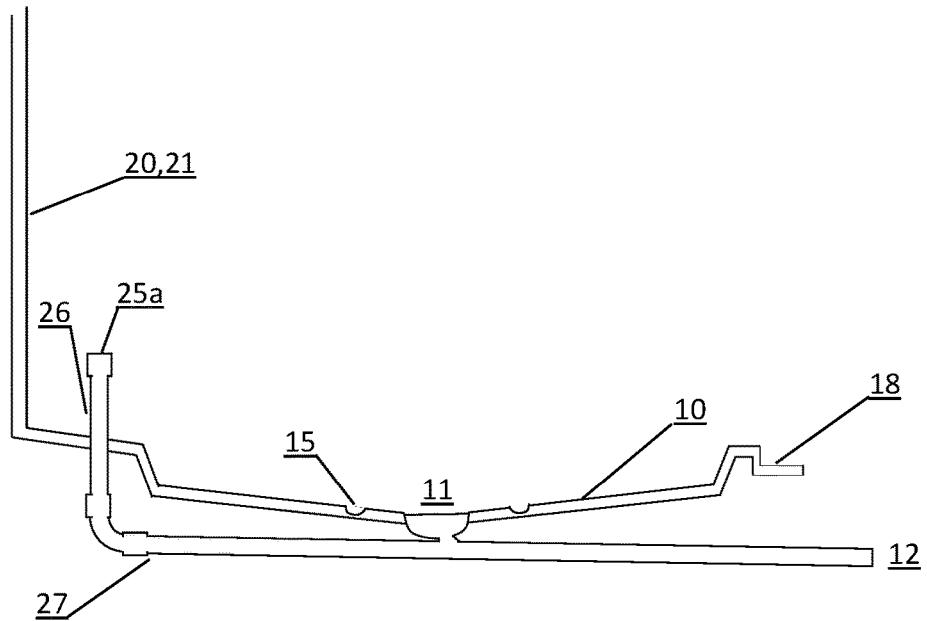
FIG. 3 shows in a sectional view a lower part of the leakage prevention module.

The fluid tight trough (10) comprises a drain (11) in fluid connection with a drainage connection (12) arranged to be connected to an external drain tube. In this embodiment the trough (11) has an outlet interconnected with the drainage connection (12) in such a way that it is a fall or inclination from the drain towards the drainage connection (12). This is illustrated in FIG. 3 showing in a simplified sectional side view a lower part of the leakage prevention module.

An important structural part of the leakage prevention module (1), is the wall (20). The wall (20) is fluid tight fixed to the trough (10), such that the wall (20) is placed behind the apparatus (2) to be leakage secured. The wall and the trough may be moulded together in a unit, or moulded in two parts that are later glued or by other means fixed together.

In an embodiment the trough (10) comprises two horizontal, parallel, wall flanges (17a, 17b), one on each side of the trough (10), wherein the first wall flanges (17a, 17b) are arranged to abut beams in a framing in a floor, and further arranged such that they are in a level above the drain (11) as illustrated in FIG. 1. The flanges will therefore secure the steady position of the trough in the floor. Correspondingly, the wall comprises in an embodiment two vertical, parallel, first wall flanges (27a, 27b), one on each side of the wall (20), wherein the first wall flanges (27a, 27b) are arranged to abut beams in a framing in a wall.

In an embodiment the trough (10) comprises a second horizontal floor flange (18) perpendicular to the first floor flanges, wherein the second floor flange (18) is arranged to support a floor covering arranged over the framing from below. This flange will then act as a supporting element for the main floor added on top. The top of the flange is arranged so that it is flush with the top of the beams.

In the same way the wall (20) in an embodiment comprises a second horizontal wall flange (29) acting like a supporting element for the inner wall mounted thereto. The side of the flange is arranged so that it is flush with the inside of the studs.

In an embodiment the trough and the wall also comprises third support flanges for the flooring and the inner wall arranged in parallel and outside the first floor flanges (17a, 17b) and the first wall flanges (27a, 27b). This is not shown in the figures. The third support flanges will therefore be supporting elements for the flooring installed along the sides of the through and supporting elements for the inner wall installed along the wall.

The wall and the trough may be fixed to the floor framing and the wall studs with common fixing means, such as glue or screws.

The wall has a recess (21), meaning that some of the space between the studs (4) in the wall can be used in the leakage prevention module (1). Together with the trough recessed in the floor, this has the advantage that the leakage prevention module (1) does not occupy any additional space in the finished room, compared to not using it. This means that an apparatus to be leak prevented can be placed in the room in the same way as if the leakage prevention module (1) had not been there, but the apparatus will now be leak secured. For an end user the installation will have very small impact.

The leakage prevention module (1) comprises a first internal drain tube (25a) with a first end (26) terminated in the recess (21) and arranged to be connected to a drain tube from an apparatus (2) and a second end (27) in fluid connection with the drainage connection (12). One example is shown in FIG. 3, wherein the internal drain tube (25a) is connected to the drain and further connected to the drainage connection (12).

There are different ways of implementing this, where the tube is e.g. led under the drain as shown, or along the side of the drain, in which case the tube is connected to a tube running from the drain against the drainage connection (12). In another embodiment the tube terminates on both sides of the drain, so that all the fluid from the first internal drain tube (25a) has to pass through the drain (11). The drainage connection (12) can in this case correspond to the outlet from the drain.

The leakage prevention module (1) comprises a first feedthrough (29a) in the wall (20) and a termination module (18) arranged in the recess (21), where the termination module (18) is arranged for terminating an inlet tube led in through the first feedthrough (29a) and further comprises a first outlet (18a) arranged to be connected to a first supply tube to the apparatus (2). In this way an external supply tube for e.g. water to the apparatus (2) terminate in the termination module (18) in the leakage prevention module (1).

The leakage prevention module (1) may comprise more feedthroughs and termination modules as described in FIG. 1. This can be e.g. one termination module for cold water and one for hot water.

In an embodiment the leakage prevention module (1) is arranged to terminate double piped connections such that the shield of the double piped connection terminates in the wall (20) at the first feedthrough (29a), and the inner tube terminates in the termination module (18).

In an embodiment the leakage prevention module (1) comprises a splash shield (30) arranged to be fixed to the wall (20), above the recess (21) such that the recess (22) is splash protected. This means that, if a leak occurs in one of the terminations in the recess (22) no water or other fluid will splash against the apparatus, but be stopped by the splash shield. The recess may advantageously have an opening below the splash screen, to allow leak water to flow under the splash screen and down into the drain.

In an embodiment the splash shield is removable fixed to the wall (20), e.g. with screws or other means of fixture.

In another embodiment the splash screen (30) is hinged to the wall 820) on one side, so that it can be easily opened and closed to access the tube terminations.

In connection with the development of the leakage prevention module (1) a novel drain with specific properties has also been developed. In an embodiment of the drain shown in FIG. 4, where the leakage prevention module (1) comprises a lower opening (113) arranged to guide fluid from the drain (11) towards the drainage connection (12), and a float (111) arranged to tighten the lower opening (113) when there is no fluid in the drain.

Under normal operation there will not be any fluid in the drain or the drainage system. i.e. no leakage. If the drainage system and the drain is open, unpleasant smell will enter into the module and possibly enter the room. Traditionally a drain trap would have been used to prevent smell entering trough the drainage system. However, for an arrangement like this, it is likely that a drain trap would dry out, where the drainage is not used regularly, and smell would therefore pass through the drain trap. If one should apply a traditional drain trap to solve the problem with smell from the drainage system, this would require maintenance where fluid has to be poured into the drain periodically to prevent the drain trap from drying out. For practical reasons this can also be difficult, since the module is hidden in the building and is not so easy to access.

The proposed solution will solve this problem and ensure that smell does not pass in from the drainage even when it is dry and not in regular use.

In an embodiment the drain (11) also an upper opening (112) arranged to guide fluid from the trough (10) down into the drain (11), wherein the float (111) further is arranged to tighten the upper opening (112) if the drain (11) is filled with fluid through the lower opening (113).

If the drainage system is clogged up the drainage fluid may fill up the drain tubes. This is a potentially critical situation, since fluid that is normally led away from the first internal drain tube (25a) to the external drainage will stop and the fluid may therefore find its way through the only open way which is the upper opening (112) in the drain. This problem is solved by the invention by allowing the float in the drain to float up and tighten against the inlet of the drain, i.e. the upper opening (112) and thereby preventing drainage fluid from flowing backwards end up through the drain (11).

Return fluid cannot be prevented if the drainage system of the leakage prevention module is terminated in a traditional drain trap, since it does not have any means for preventing such re-flux.

Figure 4:
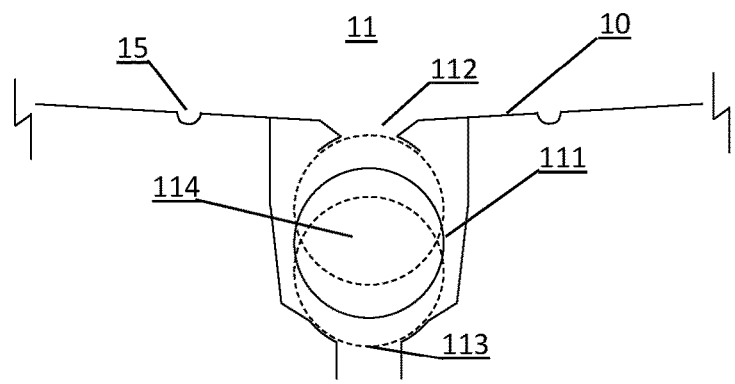
FIG. 4 shows in a sectional view an embodiment of the leakage prevention module having upper and lower openings surrounded by circular edged, and a float which is ball-formed and sphere-formed.

In an embodiment the upper and lower openings (112, 113) are surrounded by circular edges, and the float (111) is ball-formed, or sphere formed as shown in FIG. 4. This enables a secure and simple implementation of the solution. In addition the float shaped as a ball (111) and the upper and lower openings (112, 113), or the housing itself be adapted to each other so that the ball is always held in place in the vertical direction between the upper and lower openings (112, 113).

In an embodiment the float comprises an alarm device arranged to emit a signal when the float moves, for in this way to warn about a leak. The signal may be e.g. a sound or an electric signal. In an embodiment the alarm device is a bell.

In this way an automatic notification or warning is given if there is unusual activity in the drain, i.e. leaks or clogging in the drainage system, since the open drain only is arranged for draining fluids from leaks into the drainage system.

In addition to securing apparatuses placed inside the leakage prevention module, it can also be used to terminate supply tubes and drain tubes to/from a different apparatus placed outside the module, e.g. on one side thereof. There are troughs available in prior art for placing under water consuming apparatuses, and such an apparatus may e.g. be retrofitted above such a trough on the floor, where water and drainage is terminated in the leakage prevention module.

In this embodiment the leakage prevention module (1) comprises a second feedthrough (29b) in the wall (20), and wherein the termination module (18) comprises a second outlet (18b) arranged to be connected to a second supply tube led out through the second feedthrough (29b), and where the second supply tube provisions an external apparatus. Further, it comprises a third feedthrough (29c) in the wall (20), and a second internal drain tube (25b) with a first end terminated in the recess (21) and arranged to be connected to a second drain tube from an external apparatus, entered into the third feedthrough (29c), and a second end (27) in fluid connection with the drainage connection (12).

In an embodiment the leakage prevention module comprises a recess (15) in the trough (10) external to the drain (11) as illustrated in FIG. 1. If a leakage in the apparatus (2) or in any of the terminations or in the other tubing parts inside the leakage prevention module, some of the fluid will be collected in the recess (15) so that the leak easier can be detected visually. In an embodiment the recess (15) is prolonged towards the front, i.e. opposite the wall (20), so that a potential leak is visible from the front by e.g. removing the toe kick plate of the apparatus (2).

In an embodiment the leakage prevention module (1) comprises a fluid detector (16) arranged in the recess (15). The fluid detector is arranged to detect fluids, such as water accumulating in the recess (15). The fluid detector may further be connected to fluid indicator, such as a warning lamp, sound emitter or similar.

In an embodiment the termination module (18) comprises a solenoid valve (25) arranged to close the fluid supply to an apparatus (2) when the fluid detector (16) detects a fluid. The solenoid valve can then close all fluid supply into the leakage prevention module (1).

In an embodiment the leakage prevention module (1) comprises an electric socket (19) arranged to supply the apparatus (2) with electric power. This socket should be fluidly isolated from the rest of the leakage prevention module (1).

In an embodiment the leakage prevention module (1) comprises rails (50) arranged on the top of the trough (10), and arranged such that the apparatus (2) can be carried by the rails (50). In this way it will be very easy to place an apparatus in the leakage prevention module (1), even under a counter plate.

In an embodiment the leakage prevention module (1) is arranged in a way that the trough (10) can be arranged directly on top of the floor framing. The trough (10) will then extend above finished flooring and could constitute a toe kick in e.g. a kitchen so that the cabinet drawers later can be arranged directly over the trough (10). The trough (10) can in this embodiment have fastening mechanisms on the underside so that it easily can be fastened to the floor framing.

In an embodiment the leakage prevention module (1) can be placed in a socket (40) arranged to carry the trough (10) so that the leakage prevention module (1) can be placed above existing floor. In this embodiment the leakage prevention module (1) is preferably equipped with a drain pump to pump fluid from the drainage connection (12) to a higher outlet external with respect to the leakage prevention module (1).

In an embodiment the socket (40) comprises a sight glass connected to the recess (15) and arranged to indicate the presence of fluid in the recess (15), so that possible leaks can easily be detected visually in the sight class.

The leakage prevention module (1) has many applications, whereof several have already been mentioned. In addition to protect a single apparatus or device, the module can also be extended to protect several apparatuses or devices. The module can be made with a common trough for several apparatuses like; laundry machine, dryer, and water heater. Here, each of the apparatus may have dedicated rails for simple installation in the module, and uninstallation if maintenance is required.

It is also possible to make modules adapted for showers, where the trough in the module can be the floor in the shower, and where the armature is fixed inside the module on the back wall. In this way a local zone for the shower can be established. The shower zone can also be part of a larger module as has been explained previously.

By use of the leakage prevention module, it is possible to establish wet zones in otherwise dry rooms, and in this way make use of available space in a better and more secure way. Such zones may be faced, e.g. by sliding doors, in such a way that they appear to be a natural part of a room.

The invention claimed is:

1. A leakage prevention module arranged to prevent fluid leakage from a tube connected apparatus arranged in the leakage prevention module, wherein the leakage prevention module comprises: a fluid tight trough comprising a drain in fluid connection with a drainage connection; a wall with a first recess where a lower end of the wall is fluid-tight fixed to the fluid tight trough such that the first recess faces away from the drain; a first internal drain tube with a first end terminated in the first recess and arranged to be connected to a drain tube from the tube connected apparatus and a second end in fluid connection with the drainage connection; a first feedthrough in the wall; a termination module arranged in the first recess, where the termination module is arranged for terminating an inlet tube led in through the first feedthrough and further comprises a first outlet arranged to be connected to a first supply tube to the tube connected apparatus; a first leakage indicator; and a splash shield including a sheet member disposed directly between the termination module and the tube connected apparatus, and fixed to the wall of the leakage prevention module wall, such that the splash shield covers an upper section of the first recess comprising the termination module, wherein the drain comprises: an upper opening configured to guide fluid from the fluid tight trough down into the drain; a lower opening configured to guide fluid from the drain towards the drainage connection; and a float configured to tighten the lower opening when there is no fluid in the drain, and further configured to tighten the upper opening when the drain is filled with fluid through the lower opening, wherein the float comprises a bell forming a second leakage indicator.

2. The leakage prevention module according to claim 1, wherein the upper and lower openings are surrounded by circular edges, and the float is ball-formed.

3. The leakage prevention module according to claim 2, comprising a second and a third feedthrough in the wall, and wherein the termination module comprises: a second outlet arranged to be connected to a second supply tube led out through the second feedthrough, and where the second supply tube provisions an external apparatus; and a second internal drain tube with a first end terminated in the first recess and arranged to be connected to a second drain tube from an external apparatus, entered into the third feedthrough, and a second end in fluid connection with the drainage connection.

4. The leakage prevention module according to claim 2, comprising a second recess formed on a bottom of the trough and outside the drain, the second recess being spaced part from the upper opening of the drain with a radial distance, encircling the upper opening of the drain, and having a prolonging portion toward a front of the trough, thereby forming the first leakage indicator.

5. The leakage prevention module according to claim 1, comprising a second and a third feedthrough in the wall, and wherein the termination module comprises: a second outlet arranged to be connected to a second supply tube led out through the second feedthrough, and where the second supply tube provisions an external apparatus; and a second internal drain tube with a first end terminated in the first recess and arranged to be connected to a second drain tube from an external apparatus, entered into the third feedthrough, and a second end in fluid connection with the drainage connection.

6. The leakage prevention module according to claim 5, comprising a second recess formed on a bottom of the trough and outside the drain, the second recess being spaced part from the upper opening of the drain with a radial distance, encircling the upper opening of the drain, and having a prolonging portion toward a front of the trough, thereby forming the first leakage indicator.

7. The leakage prevention module according to claim 1, comprising a second recess formed on a bottom of the trough and outside the drain, the second recess being spaced part from the upper opening of the drain with a radial distance, encircling the upper opening of the drain, and having a prolonging portion toward a front of the trough, thereby forming the first leakage indicator.

8. The leakage prevention module according to claim 7, comprising a fluid detector arranged in the second recess.

9. The leakage prevention module according to claim 8, wherein the termination module comprises a solenoid valve arranged to close the fluid supply to the tube connected apparatus when the fluid detector detects a fluid.

10. The leakage prevention module according to claim 1, wherein the trough comprises two horizontal, parallel, first wall flanges, one on each side of the trough, wherein the first wall flanges are arranged to abut beams in a framing in a floor, and further arranged such that they are in a level above the drain.

11. The leakage prevention module according to claim 10, wherein the trough comprises a second horizontal floor flange perpendicular to the first floor flanges, wherein the second floor flange is arranged to support a floor covering, above the framing, from below.

12. The leakage prevention module according to claim 1, comprising rails arranged on the top of the trough, and arranged such that the tube connected apparatus can be carried by the rails.

* * * * *